United States Patent [19]
Horowitz et al.

[11] Patent Number: 5,924,053
[45] Date of Patent: *Jul. 13, 1999

[54] FRACTAL REPRESENTATION OF DATA

[75] Inventors: Franklin G. Horowitz, Sorrento; Donald J. Bone, Kaleen; Jan P. Veldkamp, Narrabundah, all of Australia

[73] Assignee: Commonwealth Scientific and Industrial Research Organisation, Campbell, Australia

[*] Notice: This patent issued on a continued prosecution application filed under 37 CFR 1.53(d), and is subject to the twenty year patent term provisions of 35 U.S.C. 154(a)(2).

[21] Appl. No.: 08/765,488
[22] PCT Filed: Jul. 3, 1995
[86] PCT No.: PCT/AU95/00402
  § 371 Date: Apr. 24, 1997
  § 102(e) Date: Apr. 24, 1997
[87] PCT Pub. No.: WO96/01529
  PCT Pub. Date: Jan. 18, 1996

[30] Foreign Application Priority Data

Jul. 1, 1994 [AU] Australia ............... PM 6614

[51] Int. Cl.⁶ ............... G06K 9/34; G06K 9/36
[52] U.S. Cl. ............... 702/90; 364/715.02; 382/249
[58] Field of Search ............... 364/581, 715.02, 364/724.05; 382/249, 254, 270, 299, 233; 348/397; 358/433, 467; 702/90

[56] References Cited

U.S. PATENT DOCUMENTS

| | | | |
|---|---|---|---|
| 4,817,182 | 3/1989 | Adelson et al. | 364/724.05 |
| 4,941,193 | 7/1990 | Barnsley et al. | 382/56 |
| 5,048,112 | 9/1991 | Alves et al. | 382/56 |
| 5,054,101 | 10/1991 | Prakash | 382/50 |
| 5,065,447 | 11/1991 | Barnskey et al. | 382/56 |
| 5,148,497 | 9/1992 | Pentland et al. | 382/54 |
| 5,347,600 | 9/1994 | Barnsley et al. | 382/249 |
| 5,384,867 | 1/1995 | Barnsley et al. | 382/56 |
| 5,768,437 | 6/1998 | Monro et al. | 382/249 |

FOREIGN PATENT DOCUMENTS

WO93/17519  7/1990  WIPO .

OTHER PUBLICATIONS

"Fractal Theory of Iterated Markov Operators with Applications to Digital Image Coding", Arnaud Jacquin Ph.D. Thesis, Georgia Institute of Technology, Atlanta, Georgia 1989 (abstract only) [hereinafter "Jacquin"].

"Fractal Block Coding of Images", Donald Monro, Frank Dudbridge, Electronics Letters, vol. 28, No. 11, pp. 1053–1055, 1992 [hereinafter Monroe et al.].

A New Image Coding Technique Unifying Fractor and Transform Coding, Kai Uwe Barthel, Jörg Schüttenmeyer, Thomas Voyé and Peter Noll, IEEE International Conference on Image Processing (ICIP '94), Nov. 13–16, 1994, Austin, Texas [hereinafter "Barthel et al."].

"Overlapped Adaptive Partitioning for Image Coding Based on the Theory of Iterated Functions Systems", Emmanuel Reusens, IEEE Proceedings of ICASSP, Image Coding, vol. 5, pp. 569–572, 1994 [hereinafter "Reusens"].

Signal Modelling with Iterated Function Systems:, Greg Vines, Ph.D. Thesis at Georgia Institute of Technology 1993 (pp. 74–109) [hereinafter "Vines"].

"A Fractal-Based Image Block-block Coding Algorithm", Mohammad Gharavi-Alkansari, Thomas Huang, IEEE Proceedings of ICASSP., Image and Multi-Dimensional Signal Processing, vol. 5, pp. 345–348, 1993 [hereinafter Mohammad et al.].

*Primary Examiner*—John Barlow
*Assistant Examiner*—Bryan Bui
*Attorney, Agent, or Firm*—Rockey, Milnamow & Katz, Ltd.

[57] ABSTRACT

A method is provided for the fractal representation of data in which the data (902) is divided into a first series of overlapping regions. A weighting function is applied to the regions. The weighted regions are expanded onto an orthonormal basis, and the orthonormal expansion is truncated at a predetermined point. A residue is formed between the data (902) and the truncated orthonormal expansion, and a fractal approximation to the residue is determined.

9 Claims, 7 Drawing Sheets

FRACTAL REPRESENTATION OF DATA

FIELD OF THE INVENTION

The present invention relates to methods for the fractal representation of data and in particular to the use of such representations in the restoration and compression of data.

BACKGROUND ART

The representation and/or the compression of data, such as images or sound, can generally be divided into two classes. The first class, commonly called "lossless" allows for an exact reconstruction of the original data from the compressed or represented data in the reconstruction or decompression process. Lossless compression normally proceeds by removal of real redundancy in the data and includes such techniques as run length encoding, Huffman coding and LZW coding which are techniques well known to those skilled in the art of compression methods.

A second class of techniques, known as "lossy" techniques represent or compress their data such that, upon decompression or reconstruction, the decompressed or reconstructed data may vary in comparison to the original data. Lossy techniques are able to be used where it is not necessary to exactly reconstruct the original data, with a close approximation to it, in most cases, being suitable. Of course, it will be readily apparent to those skilled in the art that, after initial compression via a lossy technique, the resulting compressed data can be further compressed utilising a lossless technique.

One form of well known lossy image compression utilises the Discrete Cosine Transform (DCT) in order to compress an image as part of a lossy compression system. This system, as defined by the Joint Photographic Experts Group (JPEG) standard has become increasingly popular for the compression of still images. A further standard, known as the MPEG standard developed by Motion Pictures Expert Group, has also become a popular form of video image compression. The MPEG standard also relies on the Discrete Cosine Transform for the compression of images.

An alternative compression or representation system is one based on "fractal" coding. The fractal coding technique relies on the creation of a series of transformations which, when applied to a set of data, result in that data approaching a "fixed point" which approximates the original data which is desired to be displayed. Therefore, in order to regenerate an approximation of the data utilising fractal techniques, it is only necessary to know the nature and content of the transformations as, given some initial arbitrary data, the transformations can be applied to that data in an iterative process such that the arbitrary data is transformed into a close approximation of the original data.

As, the data can be represented by its transformations, fractal coding techniques offer the opportunity to produce substantial compression of data and, in particular, offer the opportunity to produce a better compression system than the JPEG standard. Examples of fractal compression or representation techniques can be seen from PCT Publication No. WO 93/17519 entitled "Fractal Coding of Data" by Monro and Dudbridge, in addition to "Image Coding Based on a Fractal Theory of Iterated Contractive Image Transformations" by A. E. Jacquin published in IEEE Transactions on Image Processing, 1, pages 18–30, (1990).

The iterated nature of producing a final image through the continuous utilisation of transformations has led to fractal coding techniques being described as an "Iterated Function System (IFS)". The transformations utilised in the IFS are commonly of a contractive nature in that the application of a transform results in the data "contracting" to a final set of data in accordance with a "difference measure" which can be a Root Mean Square (RMS) measure or a Hausdorff distance measure, known to those skilled in the art.

Although the discussion will hereinafter be continued in relation to images, it will be readily apparent to those skilled in the art that the present invention is not limited to images and is readily applicable to any form of data for which a fractal representation or compression is desired. Furthermore, although two dimensional data is referred to in the following description, lower and higher dimensional data sets can easily be accommodated with analogous methods by those skilled in the art.

Referring now to FIGS. 1 and 2, the prior art iterated functions systems normally operate by partitioning an initial image 1 into a number of range blocks 2 which completely tile or cover the initial image 1.

In the system set out in the aforementioned article by Jacquin, the pixels in each range block 2 are approximated by a linear combination of a first element which is derived from a range base function which is defined by Jacquin to be of uniform intensity. The second portion of each pixel of a range block 2 is made up of pixels derived from a transformation of pixels belonging to some other part of the image. These other portions of the image, which can be derived utilising a number of different methods, are known as "domain" blocks. These domain blocks are transformed utilising carefully selected affine transformation functions. The affine transformation functions and their selection corresponds to the "fractal" portion of the image and, in the Jacquin system, they are used to modulate each pixel of the range block 2.

In PCT Publication No. WO 93/17519 entitled "Fractal Coding of Data", Monro and Dudbridge describe a system whereby the range base function consists of a planar facet. The range blocks are tiled in their entirety by four domain blocks. The planar facet is "corrected" or modulated by the application of a scaled version of the domain block which is one quarter the area of the original domain block. The major advantage of the Monro and Dudbridge technique is that an extensive search for the most suitable domain block is avoided.

SUMMARY OF THE INVENTION

It is an object of the present invention to provide an improved form of fractal based coding of data.

In accordance with a first aspect of the present invention, there is provided a method of coding data comprising the steps of:

(a) dividing the data into a first series of overlapping regions;

(b) applying a weighting function to said regions (such that the summations of the weights of any overlapping region is substantially equal to one);

(c) expanding the weighted regions onto an orthonormal basis;

(d) truncating said orthonormal expansion at a predetermined point;

(e) forming a residue between said data and said truncated orthonormal expansion; and, (f) determining a fractal approximation to said residue.

In accordance with a second aspect of the present invention there is provided a method of coding data as described in the preceding paragraph wherein said determination of said fractal approximation comprises the steps of:

(h) dividing the data into a second series of regions and for each of said second series of regions applying the step of:
(i) sampling a portion of said data around said region;
(j) weighting said sampled region
(k) projecting said sampled region onto said orthonormal basis;
(l) determining a residue and a corresponding residue projection magnitude;
(m) repeating steps (j)–(l) for a predetermined number of other portions of data around said region;
(n) determining the largest of said residue projection magnitudes of said predetermined number of other portions of data;
(o) adding said residue of said second series scaled by said residue projection to a current approximation of said first series of overlapping regions and storing said second series residue as the next term in said orthonormal basis, and
(p) repeating steps (i)–(o) until said residue is less than a predetermined amount.

In accordance with another aspect of the present invention there is provided a method of decoding data which has been encoded in accordance with the preceding paragraph, said method comprising the steps of:

(a) forming a data approximation from said truncated orthonormal expansion, and
(b) applying said fractal approximation to said data approximation in an iterative manner so as to produce an improved data approximation.

Preferably said applying step in the preceding paragraph includes the steps of:

(c) dividing said data into a number of regions corresponding to said second series of regions;
(d) for each of said second series of regions, applying the steps of:
(e) sampling said data around said region corresponding to said sampled region having offset information stored in said coding;
(f) calculating a residue of said sampled data with respect to the said truncated orthonormal basis;
(g) normalising the results of step (f) to produce a first fractal basis vector;
(h) scaling said first fractal basis vector by a corresponding stored coefficient and adding said scaled residue to a current approximation of a current one of said first series of overlapping regions;
(i) repeating steps (e)–(g) for a predetermined number of fractal basis vectors; and
(j) repeating step (d) to (i) until said data approximation converges.

BRIEF DESCRIPTION OF THE DRAWINGS

A number of embodiments of the present invention will now be described in relation to the accompanying drawings in which.

DETAILED DESCRIPTION

In the preferred embodiment, as will be described hereinafter, a number of improvements are implemented in relation to the derivation of the fractal basis.

The image for which it is desired to be compressed is divided into small blocks and each block is expanded onto an orthogonal basis. The basis expansion can vary from one block to the next. The first part of the basis expansion is derived from a truncated basis expansion for the current block. The rest of the orthogonal basis expansion for the block is determined from sub sampled "big blocks" in the neighbourhood of the current small block. As will further be discussed hereinafter, a Gram-Schmidt orthogonalisation process is used to calculate each unit basis vector from the sub sampled block. A search can then be performed to find the best matching domain block for the expansion. The basis vector can then be saved as an offset.

To decode an image, an approximation to its unit vector can be generated by the Gram-Schmidt process from the stored offset representing the basis vector. As the orthogonalisation process consists of a simple inner product, a more extensive search can be performed to find the best matching block for each term in the orthogonal expansion. This is to be compared to the method of Munro and Dudbridge where the calculation of the parameters for the block involves the solution of a more complicated linear system.

Figure 3:
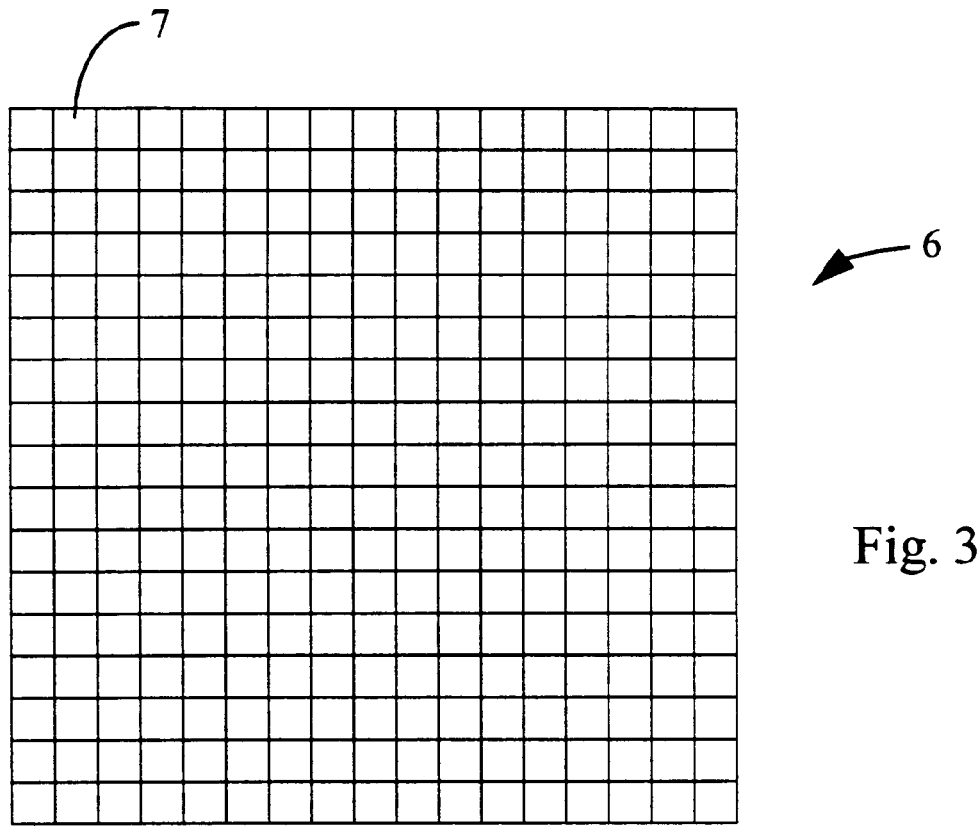
FIG. 3 illustrates an array of pixels.
Figure 4:
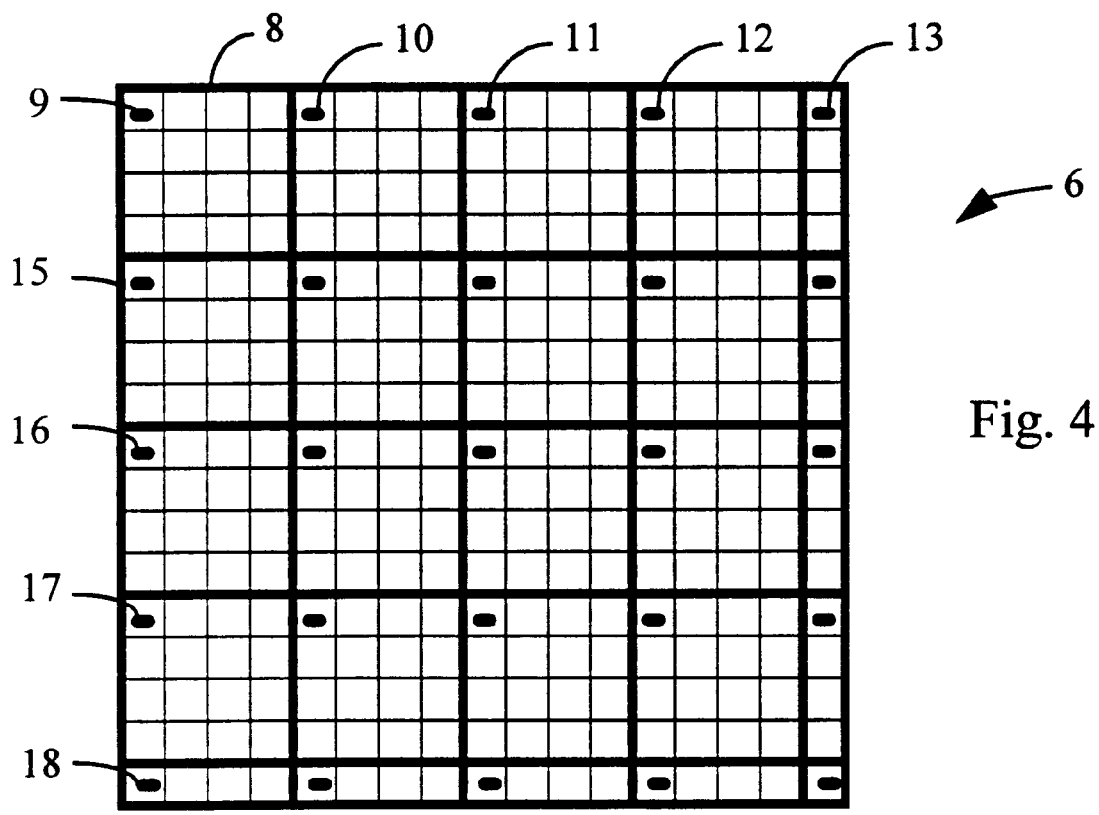
FIG. 4 illustrates the division of the array of pixels of FIG. 3 into a series of small blocks.

Referring now to FIG. 3, there is shown image 6 which is made up of pixels 7. Referring to FIG. 4, the image 6 is first divided into a grid 8. It will be assumed, for the purposes of discussion of the preferred embodiment, that both the image and grid are of a square nature, however, the present invention obviously extends to other arrangements of image data and grid data. The grid interval or width is assumed to be of size N with, in the present example N being equal to 4.

Given a grid interval N, a sub sampled grid of pixels can be derived by starting in the top left corner 9 of the image and incrementing by the grid interval x (to thereby include pixels 10–13) and also incrementing in y (thereby including points 15–18). If there are N+1 grid points 9 on each axis, the image size must be MN+1. In the present example, M is equal to four.

In the preferred embodiment, a unique blocking scheme is used whereby the image is tiled by overlapping regions or range blocks which are weighted by a weighting function such that the sum of the weighting factors at any given point from the overlapping blocks is 1. Each of the weighted range blocks is obtained by selecting a square having sides of length 2N-1 and are centred on one of the grid points. The range blocks which protrude over the boundaries of the image are treated as a special case. For each grid point on a boundary, a full size 2N-1 square region block is formed by reflecting the data in the boundary. This block is then weighted and expanded in the normal manner.

Figure 1:
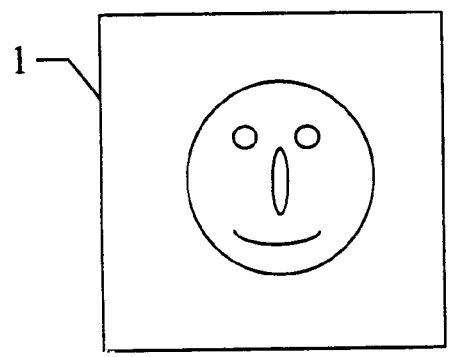
FIG. 1 illustrates a simple image.
Figure 2:
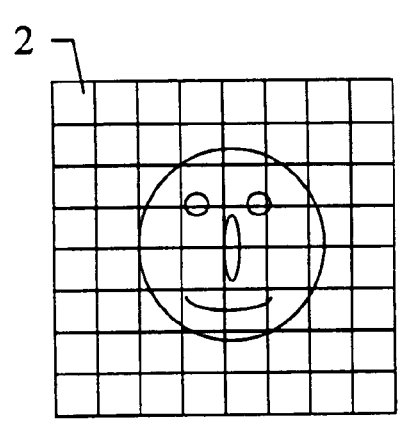
FIG. 2 illustrates the process of dividing an image into a number of small blocks.
Figure 5:
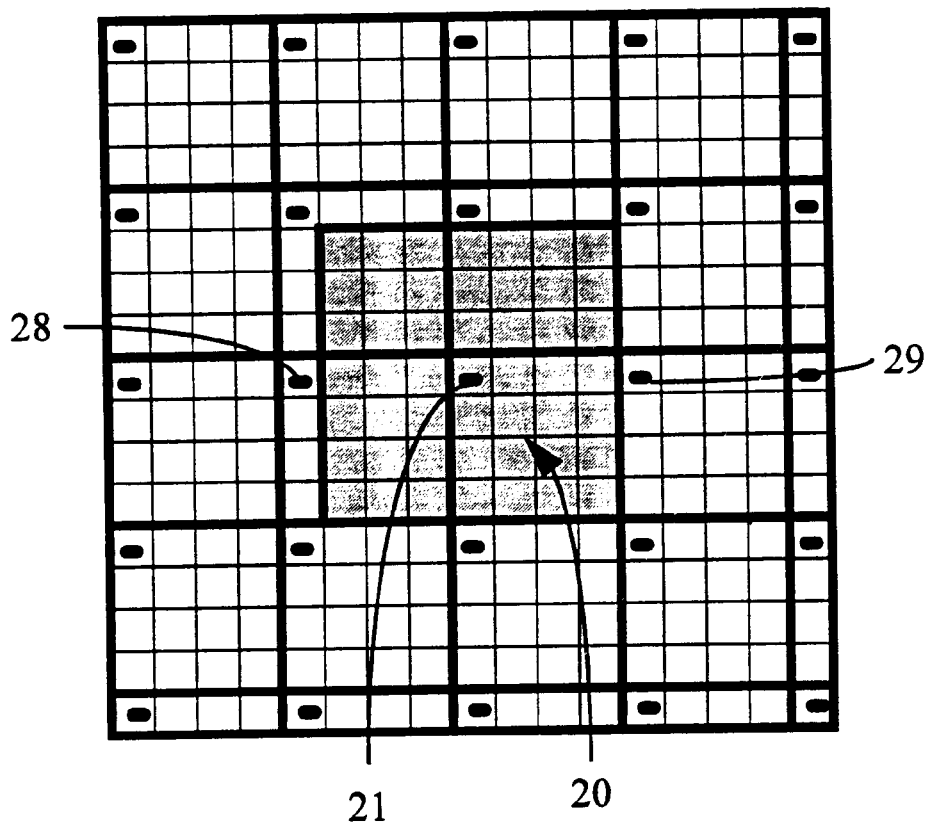
FIG. 5 illustrates the process of forming range block around a given grid point.

Referring now to FIG. 5, there is shown a first example of a weighted block region comprising shaded area 20 which is centred around the grid point 21. The weighted block 20 is weighted by a weighting function which can be of the following form:

$$W(x,y)=(1-|x|)(1-|y|) \quad |x|<1 \quad |y|<1 \qquad \text{Equation 1}$$

where x and y are measured in units of the grid interval (N).

Figure 6:
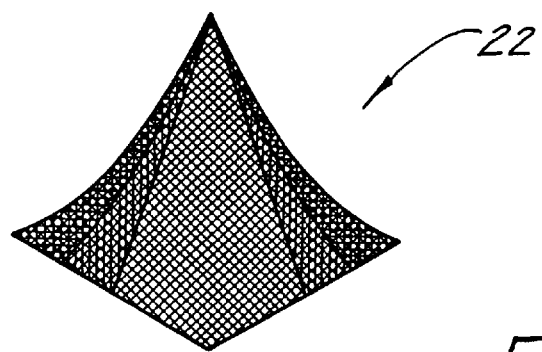
FIG. 6 is a graph of a weighting function over a range block.
Figure 7:
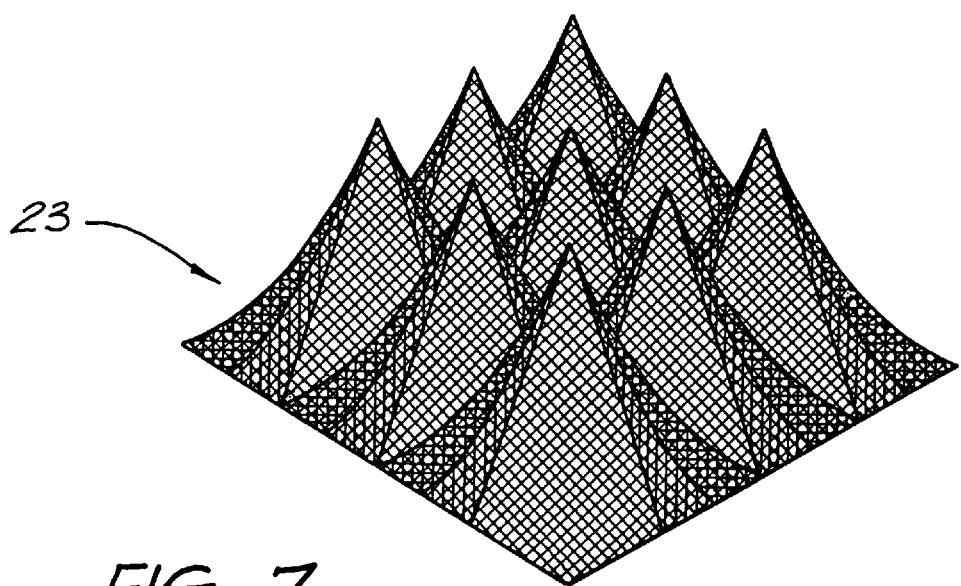
FIG. 7 is a graph of the weighting functions of a 3×3 range block array.
Figure 8:
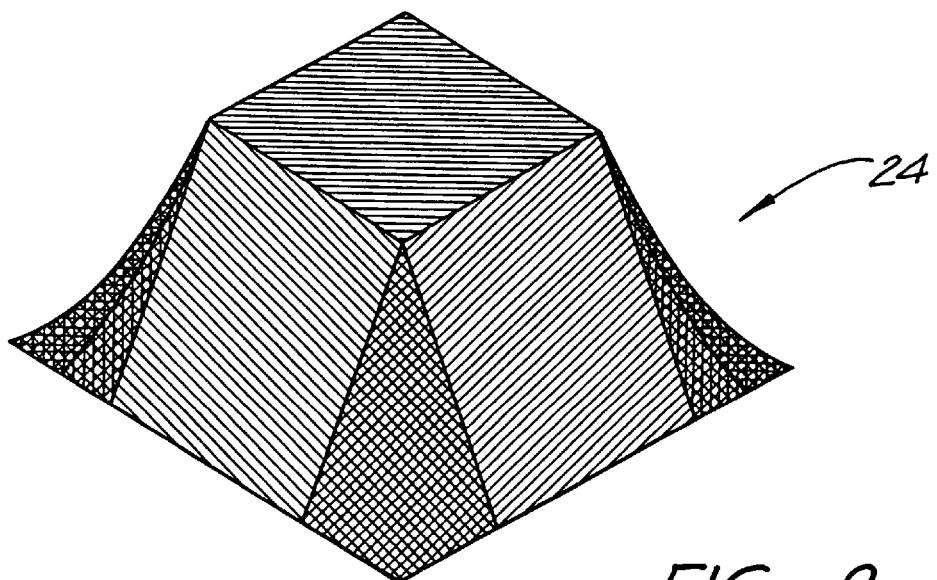
FIG. 8 is a graph of the summation of the weighting functions of FIG. 7.

In FIG. 6, there is shown a plot 22 of the weighting function W(x,y) for one range block. Referring now to FIG. 7, there is shown a 3×3 series of weighting functions of adjacent range blocks. The weighting function has the property that the sum of the weighting factors of overlapping range blocks is 1. This is illustrated in FIG. 8 which shows the summation 24 of the corresponding range blocks 23 of FIG. 7.

Each region block 20 (FIG. 5), after being weighted by the weighting function, is expanded on a basis, some terms of which are taken from a fixed basis expansion for the block, and some terms of which are generated using a Gram-Schmidt orthogonalisation process to get an orthogonal basis vector from a domain block.

The use of overlapping regions in the weighted region block scheme will require four times as many terms for an exact expansion of the image. However, the expansions, in the truncated form, form continuous linear splines and the truncated components are guaranteed to be small on average as their power is dominantly expressed in the low weighted regions of the block.

Generation of the Fixed Basis

The fixed basis for the block is taken from the truncation of a separable 2-D orthogonal expansion for which the 1-D basis is generated by an approach based on the Gram-Schmidt process for converting an arbitrary basis into an orthogonal basis. The set of linearly independent vectors from which the basis is calculated are ranged in such a way so as to produce a binary tree structured refinement of a linear spline. The first term captures the behaviour of the region on the scale of the grid intervals. The next two terms capture the behaviour on half that scale. The next four terms capture behaviour on a quarter of the grid size, and the final eight terms complete the basis expansion on the finest scale.

The orthonormal basis is constructed as follows:

The first function or vector is simply;

$$f_0(x) = \begin{cases} 1-|x| & -1 \leq x \leq 1 \\ 0 & -1 > x > 1 \end{cases} \qquad \text{Equation 2}$$

with the coordinates chosen such that x=-1 at a previous grid point 28 and x=+1 at the next grid point 29 (FIG. 5).

The next two linearly independent functions are as follows:

$$f_1(x)=f_0(2x-1)$$
$$f_2(x)=f_0(2x+1) \qquad \text{Equation 3}$$

which have peaks at +½ and -½ of width 1.

The next four functions are quarter scale copies of $f_0$ at +¼, -¼, +¾ and -¾ respectively. As the ordering of the independent vectors will affect the basis, the sequence is chosen to be of an increasing offset from the origin and with positive displacement taking precedence over negative displacement. This ordering should be approximately the ordering of the power in the components of the weighted block.

The final set of vectors is a series of ⅛ size replicas of $f_0$ at ⅛, -⅛, ⅜, -⅜, ⅝, -⅝, ⅞, and -⅞. Of course, this process could be continued to produce a linearly independent set of vectors for any grid sub interval which is a power of 2.

This set of one dimensional functions is sampled at the pixel interval to form a set of linearly independent vectors (assuming the same pixel interval in x and y directions). The resulting vectors are used to form an orthonormal basis using the Gram-Schmidt process as follows:

(a) The first basis vector comprises a normalised version of $f_0$.
(b) The next linearly independent vector, in this case $f_1$, is projected onto the sub space spanned by the previously determined basis vectors.
(c) A residual is calculated with respect to this projection. This residual will be orthogonal to the sub space spanned by the current basis.
(d) The residual vector from step (c) is normalised. This becomes the next basis vector and the sub space is expanded.
(e) Repeat steps (b) to (d) until all of the linearly independent vectors have been used.

The orthonormal basis from the Gram-Schmidt process is then formed, from each of the resulting vectors, into the rows of a square matrix of width 2N-1. If this matrix is denoted O, and the initial region block is denoted B, which is also a 2N-1×2N-1 matrix, a transform β can be constructed as follows:

$$\beta=(O(OB)^T) \qquad \text{Equation 4}$$

The final matrix is the coefficients for each of the terms in a two dimensional orthogonal expansion. β will also be a $K=(2N-1)^2$ matrix. If the K terms of β are sorted in order of magnitude, the RMS error on truncating the ordered expansion to n terms will be:

$$\sigma_n = \left(\frac{1}{K}\sum_{i=n+1}^{K} c_i^2\right)^{\frac{1}{2}} \qquad \text{Equation 5}$$

where the $C_i$'s are the coefficients of the terms in the two dimensional orthogonal expansion.

As the RMS error is known, it is possible to choose the desired accuracy for the expansion on the fixed part of the basis.

Alternatively, if it is desired to set a threshold for the RMS error then, if the magnitude of each of the terms which are discarded is less than a first threshold then the RMS error must be less than a second given threshold. As most of the terms will be substantially less than the first threshold, the second threshold should be chosen to be a factor two to three times larger than the desired RMS error.

Given a truncated expansion of the region block, a residue, being the difference between the original block and the truncated expansion can be encoded by projection onto the fractal basis as will be further described herein below.

Generation of the Fractal Basis

The orthogonal fractal basis is not fixed. It is generated from the image through a search process which comprises the following eight steps:

1. A pixel is selected within the 2N+1 by 2N+1 region block around the grid point on which the small block is centred.
2. A big block is formed by sampling N-1 pixels above and below the selected pixel with an increment of two pixels between samples.
3. The weighting function is applied to the resulting big block and it is projected onto the same component of the orthogonal basis used for the small block.
4. A residue vector B is derived with respect to the truncated orthogonal basis expansion for the weighted big block.
5. The residue B is normalised and a length $\alpha$ is derived, being the length of the projection of the small block residue onto the normalised residue from the big block.

If the smaller block residue is denoted $A_i$ and the normalised big block residue with respect to the same basis is denoted $B_j$, then these two residues can be thought of as vectors with the pixels in some fixed order being the components of the vector. The RMS difference is used as the measure of the closeness of two residuals. Of course, other useful metrics corresponding to other norms for the vector space are known to those skilled in the art. It is therefore desired to find the match that minimises the RMS error. This is equivalent to maximising the projection length which, for a given i and j, can be easily calculated using:

$$\alpha_{ij} = A_i \cdot B_j \qquad \text{Equation 6}$$

6. Steps 1 to 5 are then repeated for all valid big block centres including offsets and reflections.
7. The largest $\alpha$ is then the next coefficient in the expansion and the offset and reflection indices give the key to generating the estimate of this basis vector in the decoding.
8. If the residue is small enough, then the expansion process is terminated otherwise the new small block residue is calculated and steps 1 to 8 repeated to find the best match to this new residue.

The information which represents the image and which is stored or sent comprises the fixed basis coefficients and indices in addition to the fractal basis coefficients and the offset and reflection indices.

The Decoding Process

The decoding process for the reconstruction of the image proceeds as follows:
1. The first step in the decoding process is to form the functional parts of the expansion with the terms of the expansion corresponding to elements of the matrix β. Those elements corresponding to the retained terms remain unchanged, with the elements corresponding to the discarded components being set to 0. The truncated approximation is then as follows:

$$\hat{B} = O^{-}(O^{-1}\hat{\beta})^T \qquad \text{Equation 7}$$

where $\hat{\beta}$ is the truncate of matrix β
2. From each small block, an associated (2N+1)×(2N+1) big block is formed from the linearly interpolated image.
3. The big block is sub sampled at every second point in the x and y directions starting at the top left corner of the block.
4. Any appropriate x flip or y flip and transpose operations are applied.
5. The residue of the sub sampled big block is calculated with respect to the orthogonal sub space formed by the functional approximation. This is achieved by applying the forward transform, setting the retained elements to 0, and then applying the inverse transform.
6. The residue of step 5 is normalised, thereby providing an approximation to the first fractal basis vector.
7. The fractal basis vector of step 6 is multiplied by the appropriate scaling factor and added to the small block.
8. Subsequent fractal basis vectors are obtained by the same calculation on the appropriate big block. However, the projection onto the earlier orthonormal basis vectors must also be removed from the residue.
9. The steps 2 to 8 are then repeated for all of the small blocks.
10. The steps 2 to 9 are then repeated until the image converges.

In some images, it may prove that the above encoding-decoding process does not achieve sufficient accuracy. In these situations, during the encoding process, the A residue blocks can be divided into separate sub regions and a match of each region to a corresponding B residue region can be accomplished. As each region of the small block has a reduced number of pixels to match, the match will be improved for the whole block with a slight loss in compression. One form of representation of the subdivision process would be a quadtree division of each block which would require only one bit for each node in the quadtree to encode the tree structure.

For a reasonably well encoded image, the error vector $A_i - \alpha_{ij} B_j$ is approximately orthogonal to $A_i$. This means that the size of the error is relatively insensitive to the scale factor $\alpha_{ij}$. The scale factors can therefore be coarsely quantised without a serious impact on the accuracy, thereby achieving higher compression ratios.

Further Aspects of the Invention

Further aspects of the invention will now be described with reference to FIGS. 9 to 12.

Encoding

Figure 9:
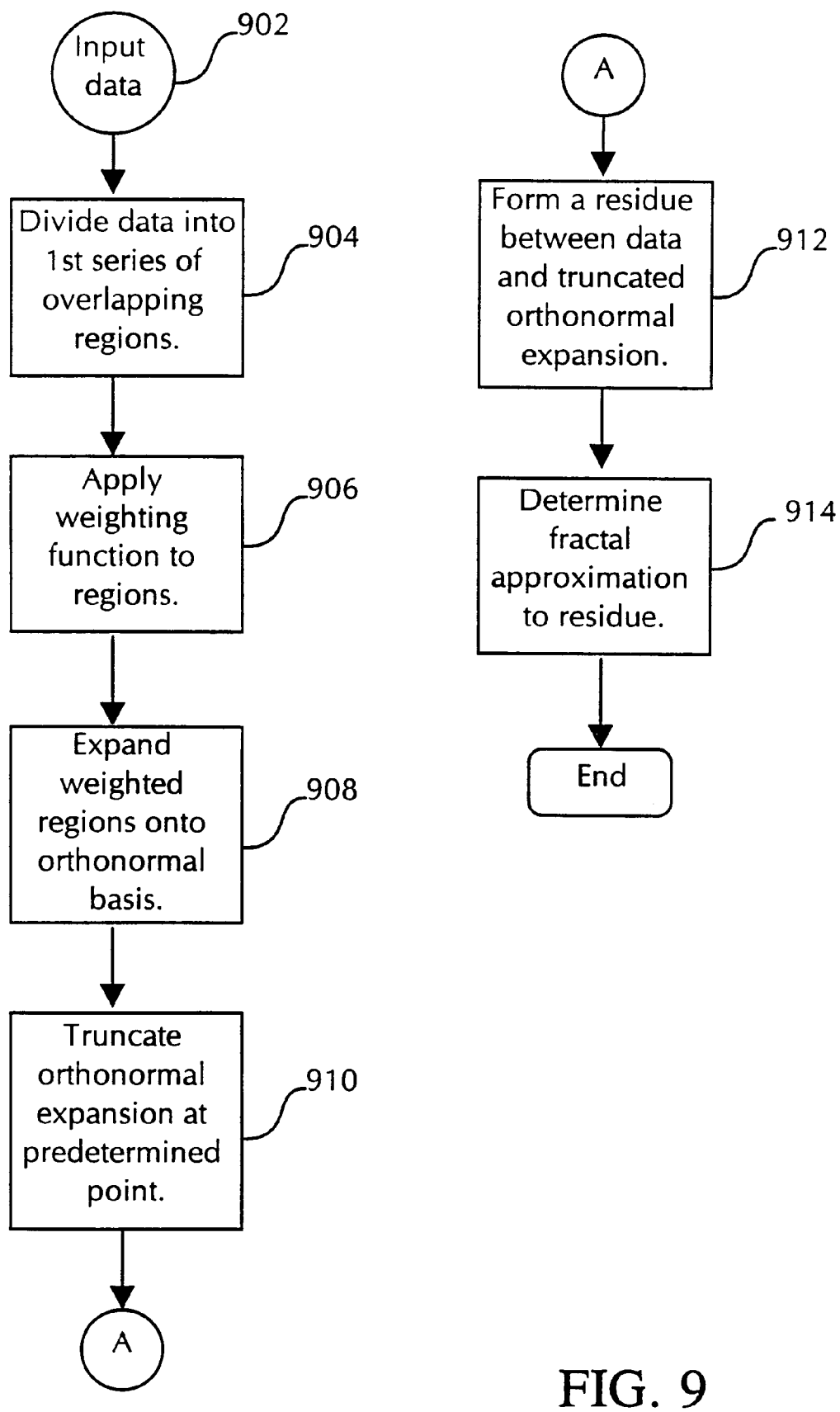
FIG. 9 is a flow chart illustrating a method of encoding data according to a further embodiment of the invention.

A flow chart of a method of coding data 902 is illustrated in FIG. 9.

In step 904, the data is divided into a first series of overlapping regions. In step 906, a weighting function is applied to the regions (such that the summations of the weights of any overlapping region is substantially equal to one). In step 908, the weighted regions are expanded onto an orthonormal basis. In step 910, the orthonormal expansion is truncated at a predetermined point. In step 912, a residue is formed between the data and the truncated orthonormal expansion. In step 914, a fractal approximation to the residue is determined.

Figure 10:
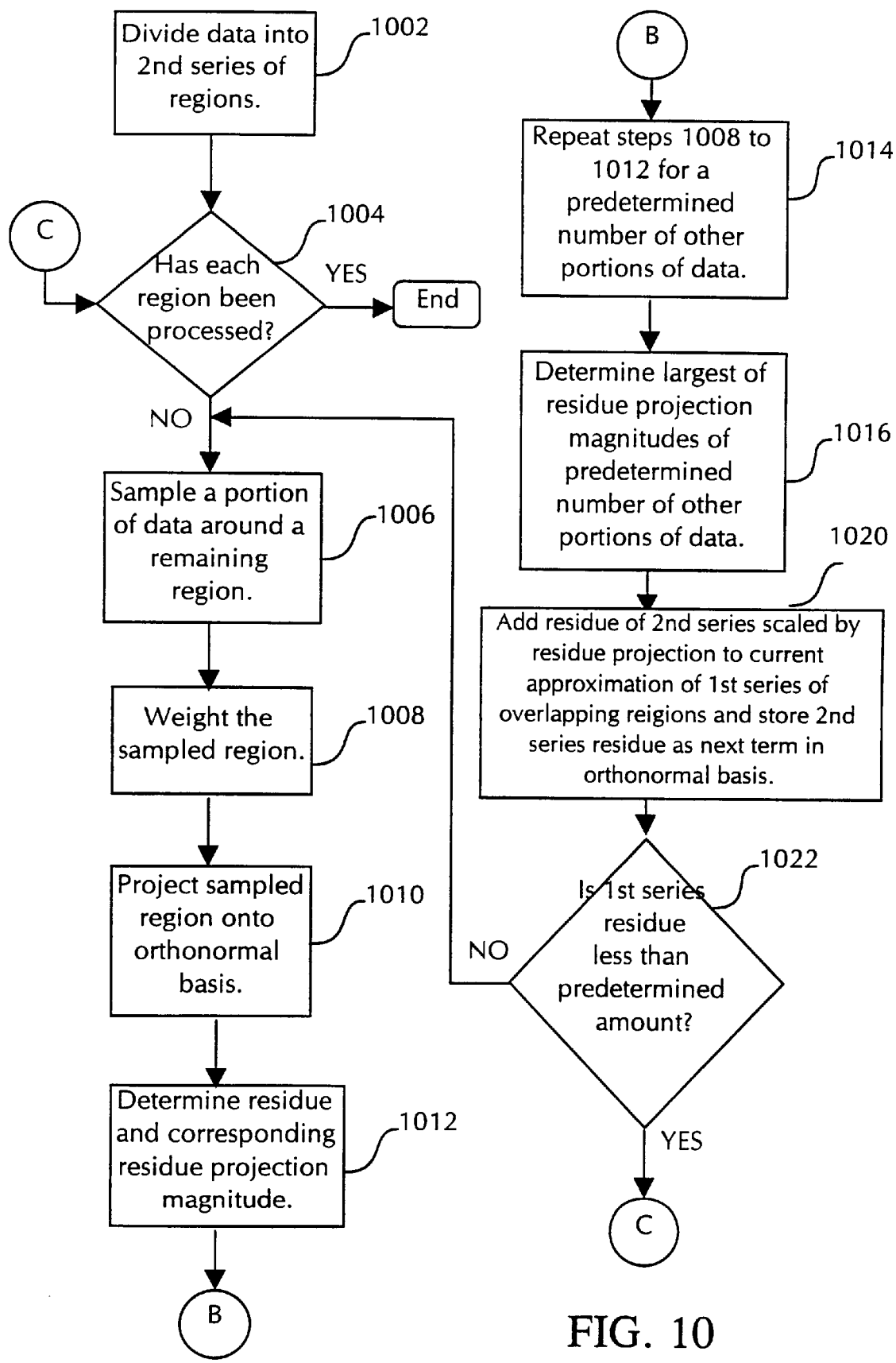
FIG. 10 is a flow chart illustrating step 914 of FIG. 9.

Preferably, the determination of the fractal approximation in step 914 of FIG. 9 comprises the steps illustrated in FIG. 10. In step 1002, the data is divided into a second series of regions. This is done to ensure that, for each of the second series of regions, steps 1006 to 1012 are applied.

In decision block 1004, a check is made to determine if each region of the second series of regions has been processed. If decision block 1004 returns true (Yes), processing ends. Otherwise, if decision block 1004, returns false (No), processing continues at step 1006. In step 1006, a portion of the data around the region is sampled. In step 1008, the sampled region is weighted. In step 1010, the sampled region is projected onto the orthonormal basis. In step 1012, a residue and a corresponding residue projection magnitude are determined. The residue is found with respect to the orthonormal basis so far identified. A residue is also found for the current one of the first series of overlapping regions with respect to the orthonormal basis so far identified. The residue of the first series overlapping region is projected against the residue of the current one of the second series regions and the residue projection magnitude is determined.

In step 1014, steps 1008 to 1012 are repeated for a predetermined number of other portions of data around the region. That is, the steps are repeated for all of the other portions of data for this current one of the first series of overlapping regions. In step 1016, the portion of data having the largest residue projection magnitude of the predetermined number of other portions of data is determined. That is, the region of the domain block with the largest residue projection magnitude is identified. The normalised residue is incorporated into the orthonormal basis as the next basis term, and the corresponding coefficient is retained as part of the approximation for the current one of the first series of overlapping regions.

In step 1020, the scaled residue of the second series scaled by the residue projection is added to the current approximation of the first series of overlapping regions and the second series residue is stored as the next term in orthonormal basis. The residue projection is the same residue projection from which the residue projection magnitude is derived. The offset information and the residue projection are stored in the encoding of the data. In decision block 1022, a check is made to determine if a first series residue is less than a predetermined amount. The residue is a new residue calculated as the difference between the current one of the first series of overlapping regions and the current approximation of the current one of first series of overlapping region. If decision block 1022 returns true (Yes), processing continues at decision block 1004. Otherwise, if decision block 1022 returns false (No), processing continues at step 1006 and steps 1006 to 1020 are repeated until the residue is less than a predetermined amount.

Preferably, expansion step 908 of FIG. 9 occurs for each weighted region.

Decoding

Figure 11:
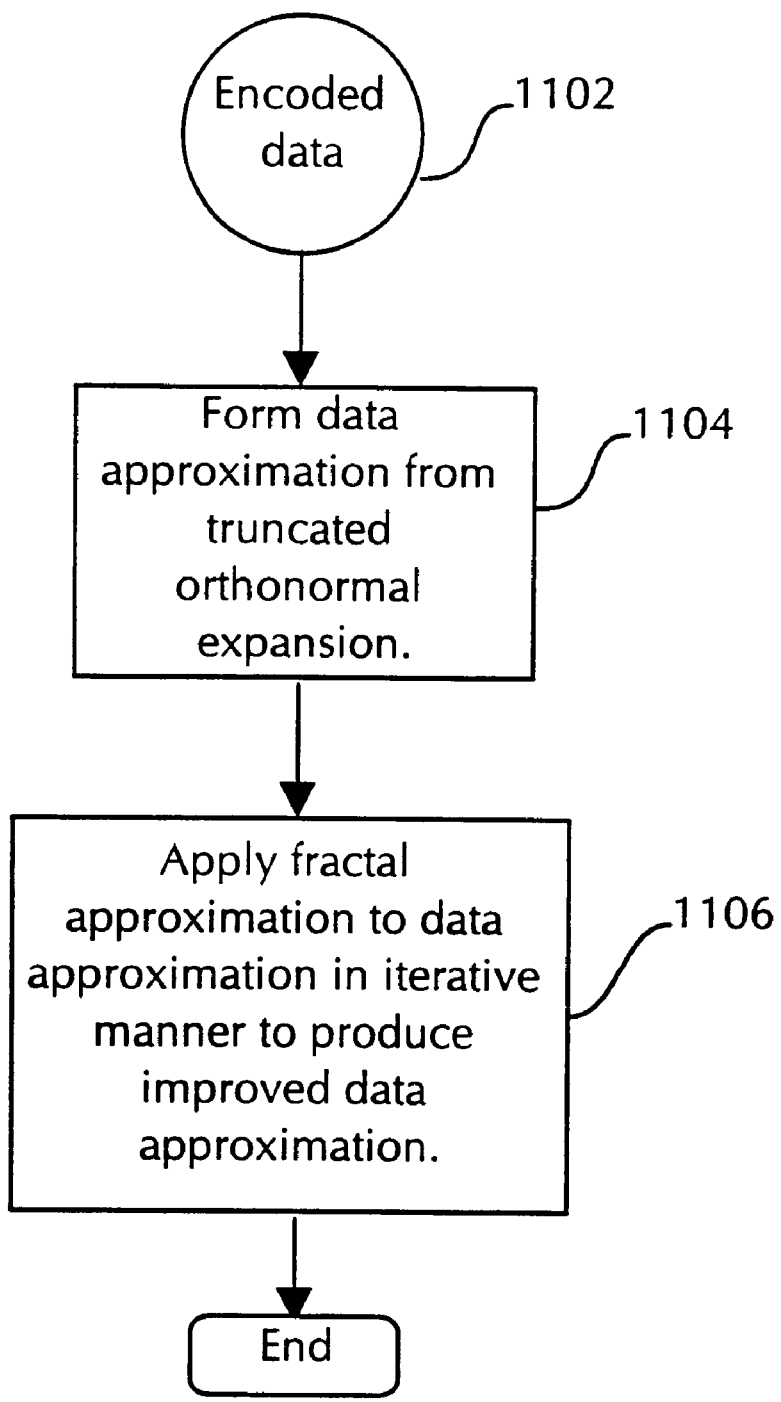
FIG. 11 is a flow chart illustrating a method of decoding data, which is encoded in accordance with the method of FIG. 9.

A method of decoding data which has been encoded in accordance with the method of FIGS. 9 and 10, is illustrated in FIG. 11. In step 1104, a data approximation is formed from the truncated orthonormal expansion using encoded data 1102. In step 1106, the fractal approximation is applied to the data approximation in an iterative manner so as to produce an improved data approximation.

Figure 12:
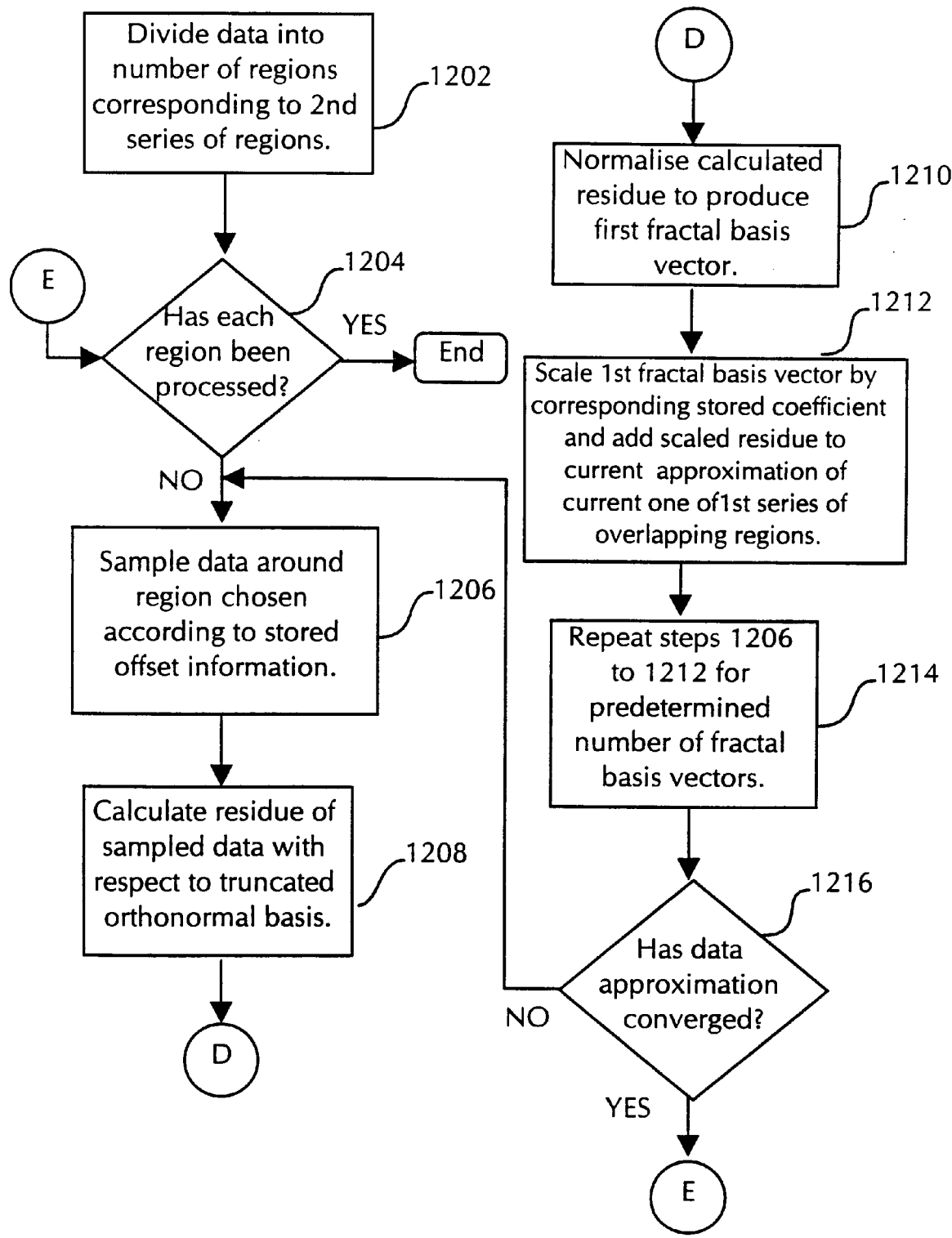
FIG. 12 is a flow chart illustrating step 1106 of FIG. 11.

Preferably, step 1106 of FIG. 11 further comprises the steps illustrated in FIG. 12. In step 1202, the data is divided into a number of regions corresponding to the second series of regions. In decision block 1204, a check is made to determine if each of the second series of regions has been processed. This is done to ensure that, for each of the second series of regions, steps 1206 to 1214 are applied. If decision block 1204 returns true (Yes), processing ends. Otherwise, if decision block 1204 returns false (No), processing continues at step 1206.

In step 1206, the data around a region chosen according to stored offset information is sampled. In step 1208, a residue of the sampled data is calculated with respect to the truncated orthonormal basis. In step 1210, the calculated residue of step 1208 is normalised to produce a first fractal basis vector. In step 1212, the first fractal basis vector is scaled by the corresponding stored coefficient and the scaled residue is added to the current approximation of the current one of the first series of overlapping regions. That approximation is then used to update the current approximation of the data from which subsequent ones of the second series of regions are taken. In step 1204, steps 1206 to 1212 are repeated for a predetermined number of fractal basis vectors.

In decision block 1216, a check is made to determine if the data approximation has converged. This is done to ensure that steps 1204 to 1214 are repeated until the data converges. If decision block 1216 returns true (Yes), processing continues at decision block 1204. Otherwise, if decision block 1216 returns false (NO), processing continues at step 1206, and steps 1206 to 1214 are repeated.

The foregoing describes a number of embodiments of the present invention with particular application to the compression of monochrome images. Its extension to full colour images will be obvious to those skilled in the art, in addition, its extension to other forms of data will be readily apparent to those skilled in the art.

We claim:

1. A method of coding data representing information obtained from a source and reproducible as an image, said method comprising the computer-implemented steps of:

(aa) obtaining said data from said information;
   (a) dividing the data into a first series of overlapping regions;
   (b) applying a weighting function to said regions;
   (c) expanding the weighted regions onto an orthonormal basis;
   (d) truncating said orthonormal expansion at a predetermined point;
   (e) forming a residue between said data and said truncated orthonormal expansion; and
   (f) determining a fractal approximation to said residue.

2. a method of as claimed in claim 1, wherein said determination of said fractal approximation comprises the steps of:

(g) dividing the data into a second series of regions and for each of said second series of regions applying the steps of:
   (h) sampling a portion of said data around said region;
   (i) weighting said sampled region;
   (j) projecting said sampled region onto said orthonormal basis;
   (k) determining a residue and a corresponding residue project magnitude;
   (l) repeating steps (l) to (k) for a predetermined number of other portions of data around said region;
   (m) determining the largest of said residue projection magnitudes of said predetermined number of other portions of data;
   (n) adding said residue of said second series scaled by said residue projection to a current approximation of said first series of overlapping regions and storing said second series residue as the next term in said orthonormal basis; and
   (o) repeating steps (h) to (n) until said first series residue is less than a predetermined amount.

3. A method of decoding data which has been encoded in accordance with the method of claim 2, said decoding method comprising the steps of:

(p) forming a data approximation from said truncated orthonormal expansion; and (q) applying said fractal approximation to said data approximation in an iterative manner so as to produce an improved data approximation.

4. A method of decoding data as claimed in claim 3, wherein said applying step comprises the steps of:

(r) dividing said data into a number of regions corresponding to said second series of regions;

(s) for each of said second series of regions, applying the steps of:

(t) sampling said data around said region corresponding to said sampled region having offset information stored in said coding;

(u) calculating a residue of said sampled data with respect to the said truncated orthonormal-basis;

(v) normalising the results of step (u) to produce a first fractal basis vector;

(w) scaling said first fractal basis vector by a corresponding stored coefficient and adding said scaled residue to a current approximation of a current one of said first series of overlapping regions;

(x) repeating steps (t) to (v) for a predetermined number of fractal basis vectors;

(y) repeating steps (s) to (x) until said data approximation converges.

5. A method as claimed in claim 1, wherein said expansion step occurs for each weighted region.

6. A method according to claim 1, wherein said data comprises image data.

7. A method according to claim 1, wherein said data comprises audio data.

8. A method according to claim 1, wherein said method steps act to perform compression on said data.

9. A method according to claim 1, wherein said method steps act to perform expansion on said data.

* * * * *